United States Patent [19]

Kotani

[11] 4,039,802

[45] Aug. 2, 1977

[54] METHOD OF AUTOMATIC OR SEMI-AUTOMATIC WELDING WITH GASES

[75] Inventor: Tamotsu Kotani, Akashi, Japan

[73] Assignee: L'Air Liquide, Societe Anonyme pour l'Etude et l'Exploitation des Procedes Georges Claude, Paris, France

[21] Appl. No.: 746,232

[22] Filed: Dec. 1, 1976

Related U.S. Application Data

[63] Continuation of Ser. No. 586,152, June 12, 1975, abandoned.

[51] Int. Cl.² .................................................. B23K 5/00
[52] U.S. Cl. .................................. 219/137 R; 228/229
[58] Field of Search ........ 219/85 CA, 85 CM, 137 R, 219/121 R, 136, 130, 74; 228/229

[56] References Cited

U.S. PATENT DOCUMENTS

| | | | |
|---|---|---|---|
| 1,347,184 | 7/1920 | Smith | 219/74 |
| 1,746,196 | 2/1930 | Langmuir et al. | 219/137 R |
| 1,866,044 | 7/1932 | Krebs | 219/130 |
| 1,979,244 | 11/1934 | Anderson | 228/229 |
| 2,438,344 | 3/1948 | Meincke | 219/137 R |
| 2,891,308 | 6/1959 | Lyons | 228/229 |
| 3,163,743 | 12/1964 | Wroth et al. | 219/121 R |

FOREIGN PATENT DOCUMENTS

| | | | |
|---|---|---|---|
| 81,558 | 4/1971 | Germany | 219/137 R |
| 40-26169 | 9/1963 | Japan | 219/137 R |
| 160,554 | 5/1962 | U.S.S.R. | 219/137 R |

*Primary Examiner*—J. V. Truhe
*Assistant Examiner*—Clifford C. Shaw
*Attorney, Agent, or Firm*—Lee C. Robinson, Jr.

[57] ABSTRACT

The invention relates to an improved method of automatic or semi-automatic welding with gas, or brazing, effected by using a coil of fillet wire brought to the welding point by continuously passing through the center of a gas flame, (oxy-acetylene, oxygen-propane for example) which melts the wire and heats the work part, said improvement comprising the application of an electrical voltage between a member mounted on the forward-movement path of the fillet wire and the work part under treatment, so as to cause the passage therein of a heating current.

The electrical voltage is preferably applied either between the welding torch nozzle or the forward-movement rollers and the part treated.

4 Claims, 3 Drawing Figures

METHOD OF AUTOMATIC OR SEMI-AUTOMATIC WELDING WITH GASES

This is a continuation, of application Ser. No. 586,152 filed June 12, 1975, now abandoned.

The present invention relates to a method of automatic or semi-automatic welding be gases.

There has already been proposed an automatic or semi-automatic method of welding by gases in which the welding by gas or brazing is effected by the melting of a fillet wire and a work piece by heating with a high-temperature flame obtained by the combustion of the mixture of a combustion-supporting gas and a combustible gas (an oxyacetylene or an oxygen-propane flame for example). For the sake of convenience, all these operations will be covered hereinafter by the term "welding". The fillet wire of great length (in a coil) is brought in a continuous manner to the welding point by passing through the centre of the flame.

The method according to the invention is characterized in that an electrical voltage is applied between any member mounted on the forward-movement path of the fillet wire and the work part under treatment, in order to pass a heating current through the wire.

Figure 1:
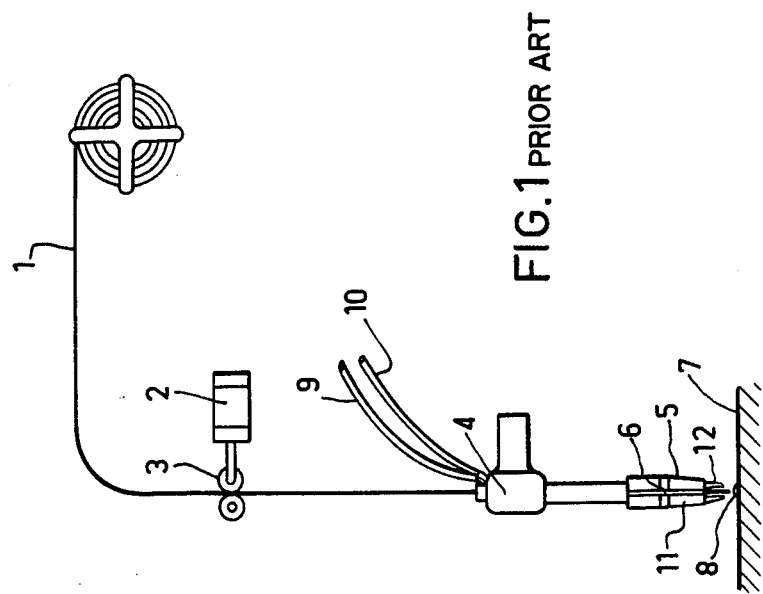
FIG. 1 illustrates the known method.

In FIG. 1, a coil of fillet wire 1 wound on a reeling machine moves forward between two rollers 3 actuated by appropriate means 2 (a motor for example) so as to be brought up to the hand-torch 4. The torch 4 and the nozzle 5 fixed on its extremity carry an internal channel 6 formed in the direction of the length for the forward movement of the fillet wire 1.

After having been introduced into the channel 6, the fillet wire is fed continuously to the member 8 to be welded. The supply of combustion-supporting gas (oxygen for example) and combustible gas (acetylene for example) is effected by the pipes 9 and 10 respectively. The two gases are mixed in the nozzle 5 and the mixture obtained is projected through the channel 6 or through the multiple orifices arranged in a ring round the central orifice 11 in order to form a flame 12. The fillet wire 1 being thus brought to the welding point 8 through the centre of the flame of circular or annular shape, has its extremity heated and melted in successive portions by the flame 12 and falls in drops on the member 8, which at this moment is already melted or heated. It is therefore only necessary to displace the torch 4 by hand in order to carry out welding in a continuous manner.

In this method of since operation, the fillet wire and the work part to be welded both are heated by the same flame, the heating condition of the fillet wire is established once and for all as soon as the most favorable flame for the heating or melting of the work part has been obtained. That is, the heating condition of the fillet wire is dependent upon the particular characteristics and requirements of the work part so that optimum conditions for the wire cannot be readily attained.

In consequence, the quantity of metal melted per unit of time is fixed, which makes it difficult to vary the condition of heating of the fillet wire so as to take account of the change in diameter of the fillet wire as it melts and the speed of its forward movement.

The present invention provides a remedy for these disadvantages, and has for its object a method of automatic or semi-automatic welding permitting the regulation of the quantity of metal melted per unit of time by choosing the heating condition of the fillet wire independently of the flame. This objective is achieved by applying an electrical voltage between a member coming into contact with the fillet wire in its forward-movement (nozzle or rollers) and the work part treated and causing a heating current to pass through the fillet wire brought to the welding point as the wire contacts the said member and the work part.

Figure 2:
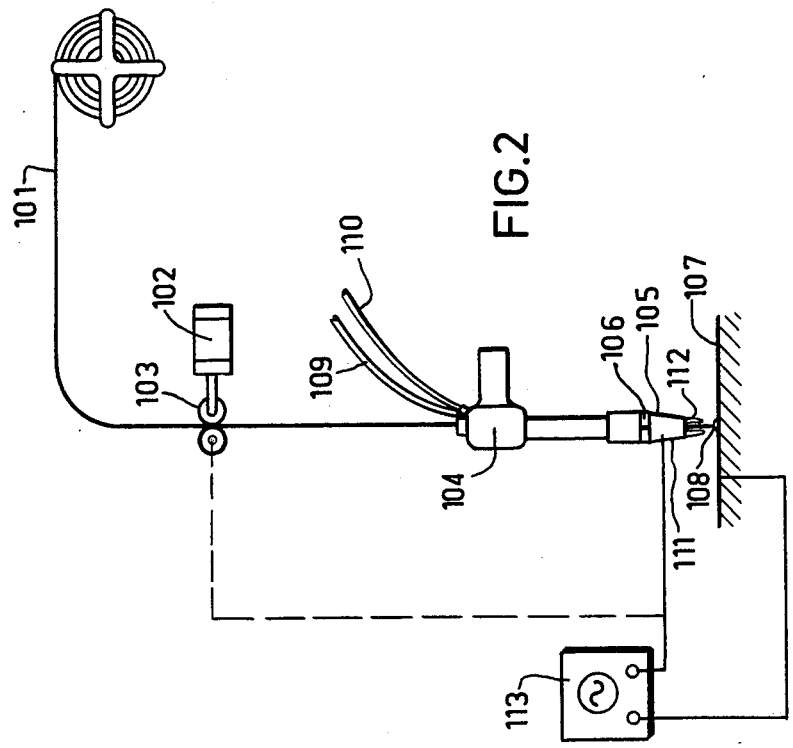
FIG. 2 illustrates a method according to a preferred embodiment of the present invention.
Figure 3:
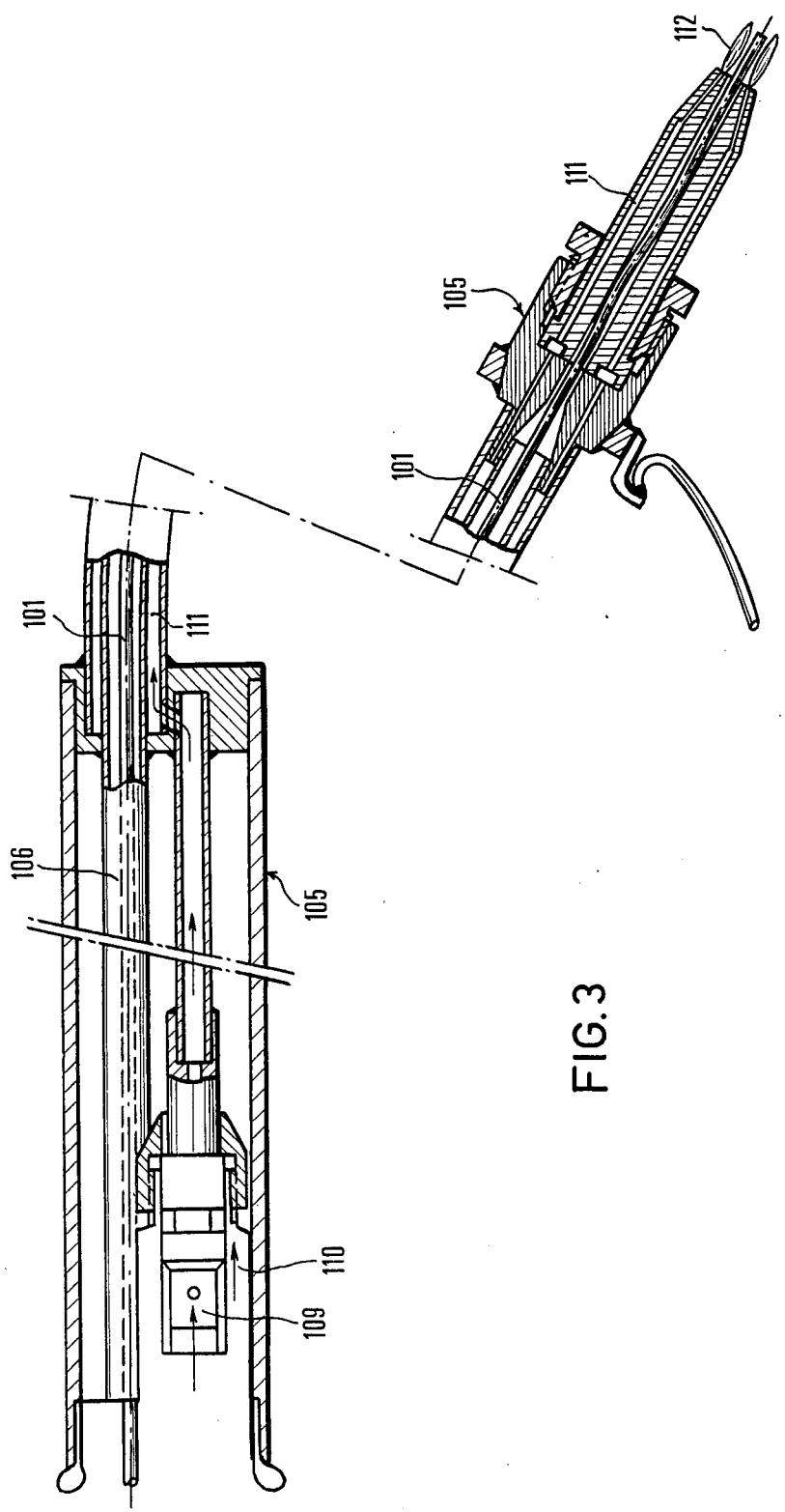
FIG. 3 illustrates welding apparatus which is useful with the method of the embodiment of FIG. 2.

The manner in which the operation is carried out is explained below with reference to FIGS. 2 and 3 which show an example of semi-automatic welding with gases, using manual torch as in FIG.1, and applying an electrical voltage between the nozzle and the work part. In those drawings, the reference numbers 101–112 correspond to the references 1–12 of FIG. 1. As in FIG. 1, a fillet wire of great length in a coil 101 is heated and melted by a flame 112 and the molten metal is applied to a welding bead 108 of a treated work part 107.

According to the prsent invention, an electrical voltage is applied between a nozzle 105 of the torch 104 and the treated work part 107, connected to a source of electricity 113 (an alternating current electric welding station, for example). When a short circuit is effected between the fillet wire 101 (which moves forward in the channel 106 while maintaining contact with the nozzle 105) and the treated work part 107, the heating current passes into the fillet wire 101. The latter is then heated by this current, but it is also heated by the flame 112. The metal melted in this manner is applied to the weld 108 of the work part 107.

In the known method in which the fillet wire 101 and the welding metal 108 are both heated by the flame 112, the power of the flame 112 is regulated to the most favorable value for heating the work part 107 or weld 108, so that the condition of heating of the fillet wire is dependent almost entirely on the characteristics of the work part. Hence, the flame which is used is not always suitable for obtaining a sufficient quantity of molten metal from the fillet wire 101 to carry out correct welding. Also it is difficult to increase the welding speed at will by increasing the quantity of metal melted per unit of time According to the method of the present invention, since the fillet wire 101 is heated not only by the gas flame but also by the short circuit current which passes into the fillet wire, it is possible to obtain heating of the fillet wire under any condition desired by regulating the said current, that is to say it is possible to heat the fillet wire to the desired temperature by regulating the current intensity independently of the power of the flame 112.

In consequence, assuming that the flame 112 has the most favorable power for heating the weld 108 of the work part 107, it is possible to heat the fillet wire 101 in such manner as to obtain the optimum quantity of metal melted per unit of time as a function of the speed of welding desired. It is also possible to vary the quantity of metal per unit of time at a given welding speed.

In the above-mentioned example, an electrical voltage is applied between the nozzle 105 and the treated work 107, and the electric current is caused to pass during the short circuit between the work part 107 and the fillet wire 101 which moves forward in the channel 106 while maintaining contact with the nozzle 105. Now, the passage of the current does not require to be always effected between the treated work part 107 and the nozzle 105. The fillet 101 being fed to the weld 108 in a continuous manner by the reel, the passage of the current can be effected at any desired point on the forward movement path of the fillet wire 101.

It is therefore only necessary to apply an electrical voltage between any member provided on the said path and the treated work 107.

It is possible for example to apply an electrical voltage between the rollers 103 and the work treated, or alternatively between a member in contact with the fillet wire 101 inside the torch 104 and the treated work 107.

As has been indicated above, the method of the present invention widens the limits of utilization of the gas energy by the addition of electric energy, whereas the conventional method utilized solely the gas energy, which also makes it possible to effect the welding in such manner as to obtain the result expected.

Since the quantity of metal melted easily can be regulated independently of the power of the gas flame in such manner as to control at will the deposit of metal on the weld, it is also easy to increase the quantity of metal melted per unit time and to increase the welding speed to a large extent, thus effecting an improvement in the condition of operation and the possibility of controlling the shape of the welding bead to be obtained.

What I claim is:

1. A method of welding a work part by use of a gas flame, comprising the steps of: supplying a combustion-supporting gas and a combustible gas, respectively, for mixture; projecting said mixture in the form of a ring to form a ring-shaped flamed; feeding an electrically conductive fillet wire from a source of fillet wire through said ring-shaped gas flame to a position spaced from said work part; heating said fillet wire and said work part by said flame such that the end of said fillet wire spaced from said work part is heated to a molten state to melt onto said work part; applying a voltage between said work part and said fillet wire; and further heating said fillet wire independently of said gas flame by passing a short-circuit current through said fillet wire, said short-circuit current flowing through said molten fillet wire and said work part when said molten wire drops into electrical circuit contact between said work part and said fillet wire.

2. The method of claim 1 wherein said fillet wire is fed by roller means to pass in contact with a nozzle of a welding torch.

3. The method of claim 2 wherein said nozzle is electrically conductive and said voltage is applied between said work part and said nozzle.

4. The method of claim 2 wherein said roller means are electrically conductive and said voltage is applied between said work part and said roller means.

* * * * *